United States Patent
Hanley et al.

(10) Patent No.: US 11,161,950 B2
(45) Date of Patent: Nov. 2, 2021

(54) ARTICLE OF THERMOSETTING EPOXY RESIN COMPOSITION AND CARBON FIBRE FABRIC, AND REINFORCED STRUCTURAL COMPONENT MADE THEREWITH

(71) Applicant: SIKA TECHNOLOGY AG, Baar (CH)

(72) Inventors: John Hanley, Sterling Heights, MI (US); Beth Nix, Farmington Hills, MI (US); Patricia Heidtman, Kriens (CH)

(73) Assignee: SIKA TECHNOLOGY AG, Baar (CH)

(*) Notice: Subject to any disclaimer, the term of this patent is extended or adjusted under 35 U.S.C. 154(b) by 428 days.

(21) Appl. No.: 15/847,348

(22) Filed: Dec. 19, 2017

(65) Prior Publication Data

US 2018/0171087 A1 Jun. 21, 2018

(30) Foreign Application Priority Data

Dec. 20, 2016 (EP) .................. 16205276

(51) Int. Cl.
*C08J 5/24* (2006.01)
*C09J 147/00* (2006.01)
(Continued)

(52) U.S. Cl.
CPC ............... *C08J 5/24* (2013.01); *B29B 11/16* (2013.01); *B32B 5/18* (2013.01); *B32B 7/06* (2013.01);
(Continued)

(58) Field of Classification Search
CPC ...... C08J 5/24; C08J 2463/00; C08J 2447/00; C08J 2375/04; C08J 2347/00;
(Continued)

(56) References Cited

U.S. PATENT DOCUMENTS

| 2010/0120936 A1* | 5/2010 | Lamon | ............... B29C 44/022 |
| | | | 521/178 |
| 2013/0221555 A1* | 8/2013 | Radtke | ............... B29C 45/0005 |
| | | | 264/28 |

(Continued)

FOREIGN PATENT DOCUMENTS

| EP | 2 154 171 A1 | 2/2010 | |
| EP | 2 623 533 A1 | 8/2013 | |
| WO | WO-2015174758 A1 * | 11/2015 | ............. B29C 70/20 |

OTHER PUBLICATIONS

Polymer properties database (http://polymerdatabase.com/Polymer%20Brands/Epoxy.html) (Year: 2020).*

(Continued)

*Primary Examiner* — Samir Shah
(74) *Attorney, Agent, or Firm* — Oliff PLC

(57) ABSTRACT

The present invention relates to a self-adhesive article comprising a non-random fabric of bundles of carbon fibres and a thermosetting epoxy resin composition. The self-adhesive article exhibits high surface adhesion and excellent dimensional stability at room temperature. The self-adhesive article is ideally suited to reinforce structural components, particularly vehicles or ancillary vehicle components. The structural components reinforced by the self-adhesive article exhibit improved impact and torsional strength.

20 Claims, 5 Drawing Sheets

(51) Int. Cl.
*C09J 175/04* (2006.01)
*B29B 11/16* (2006.01)
*B32B 5/18* (2006.01)
*B32B 27/38* (2006.01)
*B32B 7/06* (2019.01)
*B32B 7/12* (2006.01)
*B32B 27/12* (2006.01)
*C09J 163/00* (2006.01)
*C08J 5/10* (2006.01)
*C08J 5/04* (2006.01)
*B29K 63/00* (2006.01)
*B29K 307/04* (2006.01)
*B29K 105/04* (2006.01)
*B29K 105/00* (2006.01)
*B29K 105/08* (2006.01)

(52) U.S. Cl.
CPC .......... *B32B 7/12* (2013.01); *B32B 27/12* (2013.01); *B32B 27/38* (2013.01); *C08J 5/042* (2013.01); *C08J 5/10* (2013.01); *C09J 147/00* (2013.01); *C09J 163/00* (2013.01); *C09J 175/04* (2013.01); *B29K 2063/00* (2013.01); *B29K 2105/0005* (2013.01); *B29K 2105/04* (2013.01); *B29K 2105/0881* (2013.01); *B29K 2307/04* (2013.01); *B32B 2255/02* (2013.01); *B32B 2255/26* (2013.01); *B32B 2262/106* (2013.01); *B32B 2266/0271* (2013.01); *B32B 2605/00* (2013.01); *C08J 2347/00* (2013.01); *C08J 2363/00* (2013.01); *C08J 2375/04* (2013.01); *C08J 2447/00* (2013.01); *C08J 2463/00* (2013.01); *C08J 2475/04* (2013.01)

(58) Field of Classification Search
CPC ...... C08J 2363/00; C08J 2475/04; C08J 5/10; C08J 5/042; B29B 11/16; C09J 175/04; C09J 147/00; C09J 163/00; B32B 27/12; B32B 2262/106; B32B 2260/046; B32B 2255/02; B32B 2264/102; B32B 2307/732; B32B 2307/718; B32B 2255/26; B32B 2605/12; B32B 3/14; B32B 27/38; B32B 27/22; B32B 2605/00; B32B 2260/021; B32B 2264/104; B32B 2264/10; B32B 2605/10; B32B 2264/101; B32B 2266/0271; B32B 2255/06; B32B 2250/44; B32B 2307/308; B32B 2264/107; B32B 2605/08; B32B 1/08; B32B 5/18; B32B 5/026; B32B 7/12; B32B 15/046; B32B 27/20; B32B 5/245; B32B 5/12; B32B 15/14; B32B 5/024; B32B 5/20; B32B 15/08; B32B 7/06; B29K 2105/04; B29K 2307/04; B29K 2105/0881; B29K 2063/00; B29K 2105/0005

See application file for complete search history.

(56) References Cited

U.S. PATENT DOCUMENTS

2013/0280479 A1* 10/2013 Okada .................. C08J 5/042
                                                      428/114
2015/0191592 A1   7/2015 Ishimoto et al.
2016/0346959 A1* 12/2016 Corden ................. B29C 70/38
2017/0081504 A1*  3/2017 Park .................... C08J 5/043

OTHER PUBLICATIONS

Jul. 7, 2017 Extended Search Report issued in European Patent Application No. 16205276.5.

* cited by examiner

ARTICLE OF THERMOSETTING EPOXY RESIN COMPOSITION AND CARBON FIBRE FABRIC, AND REINFORCED STRUCTURAL COMPONENT MADE THEREWITH

TECHNICAL FIELD

The present invention relates to an article comprising a thermosetting epoxy resin composition and a carbon fibre fabric, and more particularly to use thereof as structural reinforcements.

PRIOR ART

Polymer matrix composites or "fibre-reinforced plastics" are the materials in which a polymer matrix resin is impregnated into reinforcing fibres. The products formed using polymer matrix composites have been used in various industries such as automotive, aerospace, naval constructions and sports. The use of polymer matrix composites is associated with advantages such as high strength-to-weight ratio, high stiffness-to-weight ratios, higher fatigue strength and higher corrosion resistance. The fibre reinforced plastics are used very frequently to make light weight composites that have improved mechanical properties, such as flexural and torsional strength.

Imparting additional flexural and torsional strength to a sheet metal is of immense importance, especially in the automotive industry. A number of methods or solutions are developed over the years to prepare the sheet metal or vehicle components having improved flexural and torsional strength. Traditionally, a top layer of glass fibre fabric (or cloth) is applied, utilizing a tacky epoxy based preformed compound onto the surface of the sheet metal. However, the resulting composite of the sheet metal and the glass fibre fabric formed using this method has poor flexural strength. The prerequisite to achieve high flexural strength is that the reinforcement fibre fabric should be completely adhered to the structural adhesive. But, in case of glass fibre fabric and epoxy adhesive solution, the bonding is irregular owing to the weaving pattern of the glass fibre fabric unless special, more expensing processing methods are employed.

The other method used to improve the flexural strength of the sheet metal is to use a thicker layer of glass fibre fabric utilizing a tacky epoxy based preformed compound onto the surface of the sheet metal, making the composite stiffer and thicker. Thus, it becomes difficult to use such composites on curved strained surfaces within vehicles or other structural components.

Recent trend in the industry is to use reinforcing articles or prepregs formed using thermosetting resins and fibre reinforcements for reinforcing structural components. "Prepreg" is a common term for a reinforcing fabric that has been pre-impregnated with a resin system. One of the most important advantages associated with the use of such reinforcing articles or prepregs is that they are convenient to handle and use. Further, these reinforcing articles can also be made available in easy to use forms such as tapes, fabrics, patches, strips. Using reinforcing articles in these forms makes it is easy to adjust the reinforcement positioning, number of layers and orientation of the reinforcing article in the structural component. Besides the requirements that the reinforcing articles should be able to form composites with improved properties and be convenient to handle, there is a need for such reinforcing articles to have sufficient tack that allows them to be mounted self-adhesively onto structural components/substrates.

To improve the handling of such reinforcing articles, it is also desirable that the thermosetting resin composition possesses a solid aggregate state and exhibits tacky surface at room temperature. Known thermosetting resin compositions used for preparing reinforcing articles, especially from high-impact epoxy resin adhesives, are typically liquid or paste-like at room temperature. This is a disadvantage if the composition is to be stored in a dimensionally stable form such as a three-dimensional article, until it is used and subsequently cured to completion.

SUMMARY OF THE INVENTION

The present invention was made in a view to overcome the problems described above, and one of the objects of the present invention is to provide advanced articles that have improved properties especially high surface adhesion at room temperature and ease of handling. Another object of the present invention is to reinforce a structural component in order to improve its impact and torsional strength, using the article of the invention.

To solve the problem, the present invention provides an article having a three-dimensional extent, more preferably having a sheet-like form, more particularly being in the form of a strip or a sheet or a patch comprising a first layer L1 and a second layer L2. The first layer L1 comprises a non-random fabric of bundles of carbon fibres and the second layer L2 comprises a thermosetting epoxy resin composition. The thermosetting epoxy resin composition comprises an epoxy resin A having on average more than one epoxide group per molecule, a hardener B for the epoxy resins which is activated by elevated temperature, preferably at least one accelerator C and at least one impact modifier D. The epoxy resin A is 10-50 weight %, more particularly 20-45 weight %, preferably 20-35 weight %, most preferably 20-30 weight %, based on the total weight of the epoxy resin composition. The hardener B for the epoxy resins is 1-6 weight %, more particularly 2-5 weight %, based on the total weight of the epoxy resin composition. The accelerator C is 0-3 weight %, more particularly 0.1-2.5 weight %, preferably 0.2-0.5 weight %, based on the total weight of the epoxy resin composition. The impact modifier D is 10-50 weight %, more particularly 15-45 weight %, preferably 20-25 weight %, based on the total weight of the epoxy resin composition. The thermosetting epoxy resin composition is tacky at room temperature, more particularly, after the surface of the thermosetting epoxy resin composition has been pressed with a thumb, exerting a pressure of 5 kg for 1 second, a thermosetting epoxy resin composition having an intrinsic weight of 50 g can be lifted up for at least 5 seconds. The second layer L2 has a thickness of 0.4-2.5 mm, preferably 0.5-2.0 mm.

Further, the thermosetting epoxy resin composition of the article of this invention preferably comprises at least one physical or chemical blowing agent E, more particularly in an amount of 0.01-3 weight %, preferably from 0.02-0.5 weight %, based on the total weight of the epoxy resin composition.

The present inventors found that the articles of the invention possess high surface tack, are dimensionally stable at room temperature and are readily storable. Further, they provide high flexural and torsional strength to the structural components being reinforced. Additionally, because of their high surface tack they are self-adhesive in nature.

Further aspects of the present invention are subjects of further independent claims. Particularly preferred embodiments are subjects of the dependent claims.

The article of the present invention may be employed particularly for reinforcement/stiffening at locations which are not accessible to welding instruments/robots during assembly, owing to inaccessibility/narrow confines.

Because of the high surface tack provided by the thermosetting epoxy resin composition, the articles of the invention become self-adhesive in nature. Thus, during assembly they can be mounted easily, by hand for example, at inaccessible locations, where their dimensional stability and surface tack allow them to remain until being fully cured by elevated temperature.

EMBODIMENTS OF THE INVENTION

Figure 1:
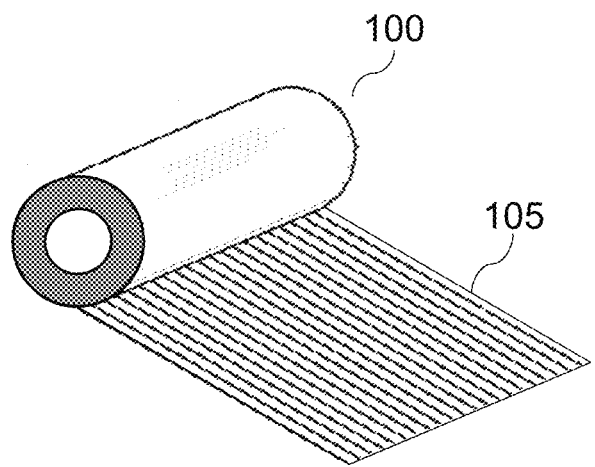
FIG. 1 illustrate a perspective view of the article of the invention according to an embodiment of the present disclosure.

The present invention relates in a first aspect to an article having a three-dimensional extent, more preferably having a sheet-like form, more particularly being in the form of a strip or a sheet or a patch comprising a first layer L1 comprising a non-random fabric of bundles of carbon fibres; and a second layer L2 comprising a thermosetting epoxy resin composition comprising:

10-50 weight %, more particularly 20-45 weight %, preferably 20-35 weight %, most preferably 20-30 weight %, of at least one epoxy resin A having on average more than one epoxide group per molecule;

1-6 weight %, more particularly 2-5 weight %, of at least one hardener B for epoxy resins which is activated by elevated temperature;

0-3 weight %, more particularly 0.1-2.5 weight %, preferably 0.2-0.5 weight %, of at least one accelerator C; and 10-50 weight %, more particularly 15-45 weight %, preferably 20-25 weight %, of at least one impact modifier D; based on the total weight of the epoxy resin composition, and the thermosetting epoxy resin composition is tacky at room temperature, more particularly, after the surface of the thermosetting epoxy resin composition has been pressed with a thumb, exerting a pressure of 5 kg for 1 second, a thermosetting epoxy resin composition having an intrinsic weight of 50 g can be lifted up for at least 5 seconds, and the second layer L2 has a thickness of 0.4-2.5 mm, preferably 0.5-2.0 mm.

The present disclosure is generally directed towards the impregnation of a non-random fabric of bundles of carbon fibres to a thermosetting epoxy resin compositions to obtain a self-adhesive article, preferably a reinforcing article, having improved properties. The resulting article, preferably reinforcing article (or prepreg) may be present in the form selected from the group consisting of, an article having a three-dimensional extent, a sheet, a film, a patch and a ribbon.

For the purpose of this invention, the term "non-random" means a structured arrangement, an organized arrangement or an arrangement having a specific pattern.

A "non-random fabric of bundles of carbon fibre" in this document refers to a carbon fibre fabric material which is formed by arranging a plurality of bundles of carbon fibres in a specific pattern or arrangement using one or methods selected from the group consisting of weaving, knitting and braiding.

In this document, the terms "fibre", "strand," "fiber" and "filament" are used essentially interchangeably to refer to an individual component, and a contiguous collection of such components is referred to as a "tow" or "bundle". The term "bundles of fibres" or "bundles of carbon fibres" are used herein are synonymous with multifilament bundle, yarn, tow, or strand of carbon fibres/filaments.

In this document, the term "continuous carbon fibre" means that carbon fibre/filaments are substantially continuous in the fabric. The expression of 'substantially continuous' is used in consideration that there could be some cases in which a very small number of carbon filaments get broken while forming the carbon fibre bundles or the carbon fibre fabric.

The term "Unidirectional" in this document means a unidirectional (UD) fabric (or sheet) of bundles of carbon fibres wherein the majority of carbon fibres run in one direction only. A small amount of fibre or other material may run in other directions with the main intention being to hold the primary fibres in position.

An "impact modifier" in this document means an organic polymer addition to an epoxy resin matrix which even at low levels of addition, i.e. typically between 0.1 and 20 weight %, brings about a significant increase in the strength and is therefore capable of accommodating greater impact stress or jolting stress before the matrix tears or ruptures.

The dashed lines in the formulae in this document represent in each case the bond between the substituent in question and the remainder of the associated molecule.

The term "polymer" in the present document encompasses on the one hand a collective of chemically uniform macromolecules which nevertheless differ in terms of degree of polymerization, molar mass and chain length, the collective having been prepared by a polymerization reaction (chain-growth addition polymerization, polyaddition, polycondensation). The term, on the other hand, also encompasses derivatives of such a collective of macromolecules from polymerization reactions, in other words compounds which have been obtained by means of reactions, such as additions or substitutions, for example, of functional groups on existing macromolecules, and which may be chemically uniform or chemically non-uniform. The term also encompasses, furthermore, what are known as prepolymers, by which are meant reactive oligomeric pre-adducts whose functional groups take part in the construction of macromolecules.

"Room temperature" refers in this document to a temperature of 23° C.

Throughout the present specification, the prefix "poly" as for example in "polyisocyanate", "polyamine", "polyol", "polyphenol", and "polymercaptan" identifies molecules which formally contain two or more of the functional groups in question.

A "vehicle" or "means of transport" for this document is any means of locomotion on water, on land and in the air. Included in particular are boats, wheeled vehicles such as cars, buses, coaches, lorries, and also rail vehicles such as trams and trains.

The "reinforced component", "reinforced article", and "reinforced structural component" within the scope of this disclosure are meant to include any suitable commercial applications, for example in the aerospace, automotive, naval constructions, and sporting goods industry. For example, the reinforced component can be a component of a vehicle.

The thermosetting epoxy resin composition preferably has a viscosity between 50-6000 Pa·s, more preferably between 100-5000 Pa·s, even more preferably 500-4500 Pa·s, most preferred between 2000-4000 Pa·s, at 80° C. The viscosity here is determined oscillographically by means of a rheometer having a heatable plate (MCR 201, Anton Paar) (1000 µm gap, measuring plate diameter: 25 mm (plate/plate), deformation 0.01 at 5 Hz, temperature: 80° C.).

The term "tacky" in this this document refers to a surface tack in the sense of instantaneous adhesion or stickiness that is preferably sufficient at room temperature so that, when pressed with a thumb, exerting a pressure of 5 kg for 1 second on the surface of the thermosetting epoxy resin composition, the thumb remains sticking to the surface of the thermosetting epoxy resin composition. Preferably in this way, after the surface of the thermosetting epoxy resin composition has been pressed with a thumb, exerting a pressure of 5 kg for 1 second, a thermosetting epoxy resin composition having an intrinsic weight of 50 g can be lifted up for at least 5 seconds.

The term "Prepreg" in this document refers to a reinforcing fabric which has been pre-impregnated with a resin system, preferably epoxy resin. Further, the resin system (typically epoxy) already includes a curing agent. Preferably, the prepregs can be easily laid or mounted into the mold or structural component without the addition of any more resin.

The article of the invention has a three-dimensional extent, more preferably having a sheet-like form, more particularly being in the form of a strip or a sheet or a patch. Typically, the article of the invention is a prepreg.

The article of the invention, preferably a reinforcing article, comprises at least two layers a first layer L1 and a second layer L2.

First Layer L1

The first layer L1 comprises a non-random fabric of bundles of carbon fibres. The first layer L1 functions as a reinforcement layer for the article of the invention.

The selection of reinforcement material is based on the properties desired in the finished product. Preferably, each of the bundles of non-random fabric of bundles of carbon fibres comprises a plurality of continuous carbon fibres.

Preferably, the non-random fabric of bundles of carbon fibres is selected from the list of woven fabric, knitted fabric, braid fabric, unidirectional sheet and fabric of multi-axial sheet. Preferably, the non-random fabric of bundles of carbon fibres is present in the form of woven fabric.

Preferably, the non-random fabric of bundles of carbon fibres is formed from warp yarns (i.e. lengthwise or longitudinal) and weft yarns (i.e. transverse). The warp yarns and the weft yarns are arranged in a specific pattern or arrangement (such as plain weave, unidirectional, bidirectional, three-dimensional and multi-axial) using one or more methods selected from the group consisting of weaving, knitting and braiding.

Preferably, in the unidirectional arrangement, the warp yarns are arranged in parallel to each other in one direction. This arrangement may also be termed as "fabric with warp yarns", "unidirectional sheet" and "unidirectional fabric".

Preferably, in the plain weave arrangement, the warp yarns are formed from carbon fibre bundles and weft yarns are formed from auxiliary fibre. This arrangement may also be considered unidirectional (or unidirectional arrangement) if the fabric comprises warp yarns in majority, particularly more than 75%, more preferably more than 90%.

Preferably, in the bidirectional arrangement, the warp yarns and the weft yarns of the carbon fibre bundles are arranged perpendicular to each other.

Preferably, in the three dimensional arrangement, the yarns are laid in x-axis, y-axis and z-axis.

Preferably, the fabric in multi-axial arrangement is obtained by overlaying two or more unidirectional sheets in different directions.

Preferably, the first layer L1 has a thickness of 0.10 to 0.80 mm, more preferably 0.12-0.6 mm and even more preferably 0.14-0.5 mm.

Preferably, the non-random fabric of bundles of carbon fibres is plain weave. Examples of such carbon fibre fabric available commercially include 3.5 Oz. 1K, Plain Weave Carbon Fibre Fabric from Fibre Glast. More preferably, the non-random fabric of bundles of carbon fibres is in unidirectional arrangement. The examples of unidirectional carbon fibre fabric are 2.9 oz. "Uni-Web" Unidirectional Carbon Fiber film from ACP Composites and 2.9 oz. SikaWrap® Hex carbon fibre film from Sika.

Second layer L2

The second layer L2 comprises a thermosetting epoxy resin composition comprising an epoxy resin A having on average more than one epoxide group per molecule, a hardener B for the epoxy resins which is activated by elevated temperature, preferably an accelerator C and at least one impact modifier D. The thermosetting epoxy resin composition preferably further comprises a blowing agent E.

Epoxy Resin A

The thermosetting epoxy resin composition comprises at least one epoxy resin A having on average more than one epoxide group per molecule. Preferred epoxy resins A having on average more than one epoxide group per molecule have the following formula (I)

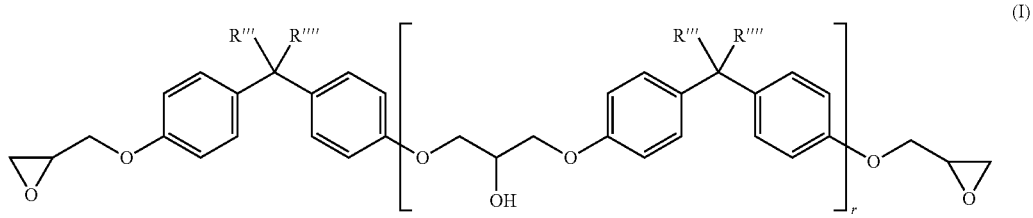 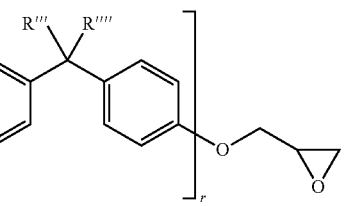

(I)

In this formula the substituents R''' and R'''' independently of one another are either H or CH$_3$. Moreover, the index r is from 0 to 1. Preferably r is less than 0.2.

The resins in question are therefore preferably diglycidyl ethers of bisphenol-A (DGEBA), of bisphenol-F, and of bisphenol-A/F. Epoxy resins of these kinds are available commercially under the tradename Araldite® GY 250, Araldite® PY 304, Araldite® GY 282 (Huntsman) or D.E.R.™ 331 or D.E.R.™ 330 (Dow) or Epikote 828 (Hexion).

Additionally suitable as epoxy resins A are what are called novolaks. These resins have in particular the following formula (II):

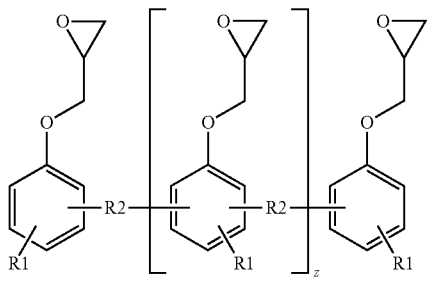

where

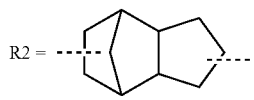

or CH$_2$, R1=H or methyl and z=0 to 7.
(II)

More particularly these are phenol or cresol novolaks (R2=CH$_2$).

Epoxy resins of these kinds are available commercially under the trade name EPN or ECN and also Tactix®556 from Huntsman, or among the D.E.N.™ product series from Dow Chemical.

The fraction of epoxy resins A is 10-50 weight %, more particularly 20-45 weight %, preferably 20-35 weight %, most preferably 20-30 weight %, based on the total weight of the epoxy resin composition.

Hardener B

The thermosetting epoxy resin composition further comprises at least one hardener B for epoxy resins that is activated by elevated temperature.

The heat-activatable hardener B is selected more particularly from the group consisting of dicyandiam ides, guanamines, guanidines, aminoguanidines and derivatives thereof, and also imidazoles, imidazole salts, imidazolines and amine complexes.

A particularly preferred hardener B is dicyandiamide.

This heat-activatable hardener B can be activated more particularly at a temperature of 100-220° C., more particularly of 120-200° C., preferably at between 160 and 190° C.

The total fraction of the hardener B is 1-6 weight %, more particularly 2-5 weight %, based on the total weight of the epoxy resin composition.

Accelerator C

The thermosetting epoxy resin composition further preferably comprises at least one accelerator C.

Preferred accelerators C are substituted ureas, selected more particularly from the list consisting of 3-(3-chloro-4-methylphenyl)-1,1-dimethylurea (chlortoluron), p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea and 1,1'-(hexane-1,6-diyl)bis(3,3'-dimethylurea). A particularly preferred accelerator C is N,N-Dimethylurea.

The amount of the accelerator C is 0-3 weight %, more particularly 0.1-2.5 weight %, preferably 0.2-0.5 weight %, based on the total weight of the epoxy resin composition.

Impact Modifier D

The thermosetting epoxy resin composition further comprises at least one polymeric impact modifier D. The impact modifier is added primarily to improve the strength of the thermosetting epoxy resin composition against the impact forces.

The impact modifier D can be solid or liquid.

The impact modifier D is preferably selected from the group consisting of blocked polyurethane polymers, carboxyl-terminated acrylonitrile/butadiene copolymers, epoxy-terminated acrylonitrile/butadiene copolymer, capped polyurethane polymers, liquid rubbers, epoxy-resin-modified liquid rubbers, and core-shell polymers. Other impact modifiers known in the epoxy adhesive art may be used in addition to, or as a substitute for the above mentioned impact modifiers.

Preferably, the impact modifier D is epoxy-terminated acrylonitrile/butadiene copolymer or derivative thereof. These types of polymeric materials are commercially available under the tradename HyPox™ such as, for example, HyPox™ RA1340 or HyPox™ RA840 from Emerald Performance Materials LLC.

Preferably, the impact modifier D is carboxyl-terminated acrylonitrile/butadiene copolymer or derivative thereof. These types of polymeric materials are commercially available under the tradename Hycar® CTBN from Nanoresins AG, Germany.

A particularly preferred impact modifier D is a terminally blocked polyurethane prepolymer of the following formula (III)

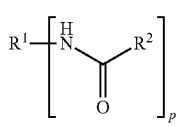

(III)

In this formula $R^1$ is a p-valent residue of a linear or branched polyurethane prepolymer PU1, terminated by isocyanate groups, following the removal of the terminal isocyanate groups, and p is from 2 to 8.

Furthermore, $R^2$ independently at each occurrence is a substituent selected from the group consisting of

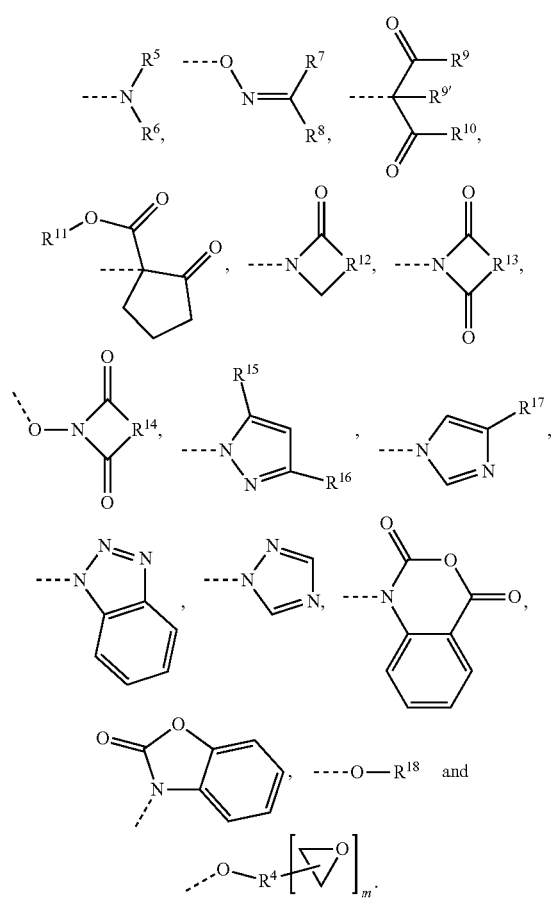

In these formulae $R^5$, $R^6$, $R^7$ and $R^8$ each independently of one another are an alkyl or cycloalkyl or aralkyl or arylalkyl group, or $R^5$ together with $R^6$, or $R^7$ together with $R^8$, forms part of a 4- to 7-membered ring which is optionally substituted.

Furthermore, $R^9$, $R^{9'}$ and $R^{10}$ each independently of one another are an alkyl or aralkyl or arylalkyl group or are an alkyloxy or aryloxy or aralkyloxy group and $R^{11}$ is an alkyl group.

$R^{13}$ and $R^{14}$ each independently of one another are an alkylene group having 2 to 5 C atoms which optionally has double bonds or is substituted, or are a phenylene group or are a hydrogenated phenylene group.

$R^{15}$, $R^{16}$ and $R^{17}$ each independently of one another are H or are an alkyl group or are an aryl group or an aralkyl group and $R^{18}$ is an aralkyl group or is a mono- or polycyclic, substituted or unsubstituted aromatic group which optionally has aromatic hydroxyl groups.

Finally $R^4$ is a residue of an aliphatic, cycloaliphatic, aromatic or araliphatic epoxide containing a primary or secondary hydroxyl group, following the removal of the hydroxide and epoxide groups, and m is 1, 2 or 3.

Residues for consideration as $R^{18}$ include in particular, on the one hand, phenols or polyphenols, especially bisphenols, following removal of a hydroxyl group. Preferred examples of such phenols and bisphenols are, in particular phenol, cresol, resorcinol, pyrocatechol, cardanol (3-pentadecenylphenol (from cashewnut shell oil)), nonylphenol, phenols reacted with styrene or with dicyclopentadiene, bisphenol A, bisphenol F and 2,2'-diallylbisphenol A.

Residues for contemplation as $R^{18}$ are on the other hand, in particular, hydroxybenzyl alcohol and benzyl alcohol following removal of a hydroxyl group.

If $R^5$, $R^6$, $R^7$, $R^8$, $R^9$, $R^{9'}$, $R^{10}$, $R^{11}$, $R^{15}$, $R^{16}$ or $R^{17}$ is an alkyl group, this group is more particularly a linear or branched $C_1$-$C_{20}$ alkyl group.

If $R^5$, $R^6$, $R^7$, $R^8$, $R^9$, $R^{9'}$ or $R^{10}$, $R^{15}$, $R^{16}$, $R^{17}$ or $R^{18}$ is an aralkyl group, this moiety is more particularly an aromatic group, which is bonded via methylene, and more particularly is a benzyl group.

If $R^5$, $R^6$, $R^7$, $R^8$, $R^9$, $R^{9'}$ or $R^{10}$ is an alkylaryl group, this group more particularly is a $C_1$ to $C_{20}$ alkyl group which is bonded via phenylene, such as a tolyl or xylyl group, for example.

The residues $R^2$ are preferably the substituents of the formulae

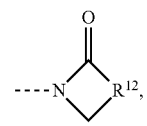

—O—$R^{18}$ or

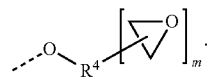

A preferred substituent of the formula

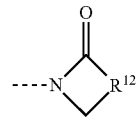

is ε-caprolactam following removal of the NH proton.

A preferred substituent of the formula —O—$R^{18}$ are monophenols or polyphenols, more particularly monophenols or bisphenols, following removal of a phenolic hydrogen atom. Particularly preferred examples of such residues $R^2$ are residues selected from the group consisting of

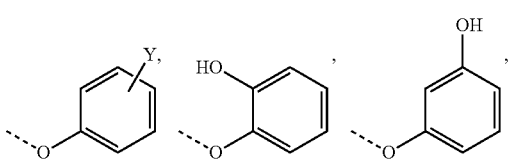

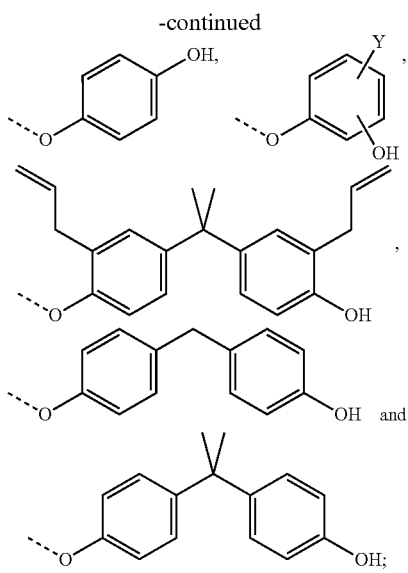

The residue Y here is a saturated or olefinic unsaturated hydrocarbon residue having 1 to 20 C atoms, more particularly having 1 to 15 C atoms. Preferred as Y in particular are allyl, methyl, nonyl, dodecyl or an unsaturated $C_{15}$ alkyl radical having 1 to 3 double bonds.

The terminally capped polyurethane prepolymer of the formula (I) is prepared from the isocyanate-terminated linear or branched polyurethane prepolymers PU1 with one or more isocyanate-reactive compounds $R^2H$. If a plurality of such isocyanate-reactive compounds are used, the reaction can be effected sequentially or with a mixture of these compounds.

The reaction is effected in such a way that the one isocyanate-reactive compound or the plurality of isocyanate-reactive compounds $R^2H$ is/are used stoichiometrically or in a stoichiometric excess, in order to ensure that all NCO groups are converted.

The polyurethane prepolymer PU1 on which $R^1$ is based can be prepared from at least one diisocyanate or triisocyanate and from a polymer $Q_{PM}$ with terminal amino, thiol or hydroxyl groups.

Suitable diisocyanates are aliphatic, cycloaliphatic, aromatic or araliphatic diisocyanates, especially commercial products such as methylenediphenyl diisocyanate (MDI), hexamethylene diisocyanate (HDI), tolylene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc., and the dimers thereof. Preference is given to HDI, IPDI, MDI or TDI.

Suitable triisocyanates are trimers or biuretes of aliphatic, cycloaliphatic, aromatic or araliphatic diisocyanates, especially the isocyanurates and biurets of the diisocyanates described in the preceding paragraph.

It will be appreciated that it is also possible to use suitable mixtures of di- or triisocyanates.

Especially suitable polymers $Q_{PM}$ with terminal amino, thiol or hydroxyl groups are polymers $Q_{PM}$ with two or three terminal amino, thiol or hydroxyl groups.

The polymers $Q_{PM}$ advantageously have an equivalent weight of 300-6000, especially of 600-4000 and especially of 700-2200 g/equivalent of NCO-reactive groups.

The polymers $Q_{PM}$ are advantageously difunctional or higher-functionality polyols with OH equivalent weights of 300 to 6000 g/OH equivalent, especially of 600 to 4000 g/OH equivalent, preferably 700-2200 g/OH equivalent. Also advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, the hydrogenation products thereof and mixtures of these said polyols.

In addition, the polymers $Q_{PM}$ used may also be difunctional or higher-functionality amino-terminated polyethylene ethers, propylene ethers, as sold, for example, under the Jeffamine® name by Huntsman, polybutylene ethers, polybutadienes, butadiene/acrylonitrile copolymers, as sold, for example, under the Hycar® ATBN name by Nanoresins AG, Germany, and further amino-terminated synthetic rubbers or mixtures of the components mentioned.

Preferred polymers $Q_{PM}$ are polyols with average molecular weights between 600 and 6000 g/mol, selected from the group consisting of polyethylene glycols, polypropylene glycols, polyethylene glycol-polypropylene glycol block polymers, polybutylene glycols, hydroxyl-terminated polybutadienes, hydroxylterminated butadiene-acrylonitrile copolymers and mixtures thereof.

Especially preferred polymers $Q_{PM}$ are α,ω-dihydroxypolyalkylene glycols with $C_2$-$C_6$-alkylene groups or with mixed $C_2$-$C_6$-alkylene groups terminated with amino, thiol or preferably hydroxyl groups. Particular preference is given to polypropylene glycols or polybutylene glycols. Also particularly preferred are hydroxyl-terminated polyoxybutylenes.

The amount of impact modifier D is 10-50 weight %, more particularly 15-45 weight %, preferably 20-25 weight %, based on the total weight of the epoxy resin composition.

To a person skilled in the art it is clear that of course mixtures of impact modifiers D may also be used.

Blowing Agent E

The thermosetting epoxy resin composition preferably further comprises at least one physical or chemical blowing agent E, more particularly in an amount of 0.01-3 weight %, preferably from 0.02-0.5 weight %, based on the total weight of the epoxy resin composition.

Preferred blowing agents are chemical blowing agents which release a gas on heating, more particularly at a temperature of 100 to 200° C. These may be exothermic blowing agents, such as azo compounds, hydrazine derivatives, semicarbazide or tetrazoles. Preferred are azodicarbonamide and oxybis(benzenesulfonylhydrazide), which release energy on decomposition. Also suitable, moreover, are endothermic blowing agents, such as sodium bicarbonate/citric acid mixtures. Chemical blowing agents of these kinds are available for example under the tradename Celogen™ from Chemtura.

Physical blowing agents can also be used. Examples of suitable physical blowing agent is Expancel™ by Akzo Nobel.

Particularly suitable blowing agents are those of the kind available under the trade name Expancel™ from Akzo Nobel or Celogen™ from Chemtura.

Preferably, the thermosetting resin composition further comprises at least one filler. Particularly suitable fillers are mica, talc, kaolin, wollastonite, feldspar, syenite, chlorite, bentonite, montmorillonite, calcium carbonate (precipitated or ground), dolomite, quartz, silicas (pyrogenic or precipitated), cristobalite, calcium oxide, aluminium hydroxide, magnesium oxide, hollow ceramic beads, hollow glass beads, hollow organic beads, glass beads and colour pigments.

The total fraction of the entire filler advantageously is 15-55 weight %, preferably 30-50 weight %, more particularly 35-45 weight %, based on the weight of the overall composition.

The thermosetting epoxy resin composition may comprise further constituents, especially stabilizers, more particularly heat and/or light stabilizers, thixotropic agents, plasticizers, solvents, dyes and pigments, corrosion inhibitors, adhesion promoters and flame retardants.

Particularly suitable stabilizers are optionally substituted phenols, such as butylated hydroxytoluene (BHT) or Wingstay® T (Elikem), sterically hindered amines or N-oxyl compounds such as TEMPO (Evonik).

The total fraction of the aforesaid further constituents is advantageously 0.1-5 weight %, preferably 0.2-3 weight %, more particularly 0.5-1.5 weight %, based on the total weight of the thermosetting epoxy resin composition.

Preferably, the first layer L1 is in direct contact with the second layer L2. More preferably, the layer L1 is at least partially embedded in the second layer L2.

Even more preferably the first layer L1 is embedded in the second layer L2 to less than 50% of the thickness of the first layer L1, preferably to less than 20%, more preferably to less than 10% of the thickness of the first layer L1.

In another aspect, the present invention also relates to an article having a three-dimensional extent, more preferably having a sheet-like form, more particularly being in the form of a strip or a sheet or a patch comprising
  a first layer L1 comprising a non-random fabric of bundles of carbon fibres; and
  a second layer L2 comprising a thermosetting epoxy resin composition comprising:
    10-50 weight %, more particularly 20-45 weight %, preferably 20-35 weight %, most preferably 20-30 weight %, of at least one epoxy resin A having on average more than one epoxide group per molecule;
    1-6 weight %, more particularly 2-5 weight %, of at least one hardener B for epoxy resins which is activated by elevated temperature;
    0-3 weight %, more particularly 0.1-2.5 weight %, preferably 0.2-0.5 weight %, of at least one accelerator C; and
    10-50 weight %, more particularly 15-45 weight %, preferably 20-25 weight %, of at least one impact modifier D;
    preferably 0.01-3 weight % of at least one physical or chemical blowing agent E, more particularly in an amount of 0.01-3 weight %, preferably from 0.02-0.5 weight %, based on the total weight of the epoxy resin composition, and the thermosetting epoxy resin composition is tacky at room temperature, more particularly, after the surface of the thermosetting epoxy resin composition has been pressed with a thumb, exerting a pressure of 5 kg for 1 second, a thermosetting epoxy resin composition having an intrinsic weight of 50 g can be lifted up for at least 5 seconds, and the second layer L2 has a thickness of 0.4-2.5 mm, preferably 0.5-2.0 mm.

It may further be advantageous if the thermosetting epoxy resin composition further comprises at least one physical or chemical blowing agent E, more particularly in an amount of 0.01-3 weight %, preferably from 0.02-0.5 weight %, based on the total weight of the epoxy resin composition.

The article of the invention can be present in the form of an expandable article and a non-expandable article. To a person skilled in the art it is clear that the expandable article is formed by using the physical or chemical blowing agent E (as a constituent) in the thermosetting epoxy resin layer L2 of the article of the invention. Preferably the physical or chemical blowing agent E is used in an amount of 0.1-3 weight %. Further, the article of the invention can be considered in the form of the non-expandable article, if the thermosetting resin layer L2 of the article of invention does not contain any physical or chemical blowing agent E as its constituent. The article of the invention mentioned in this patent document will refers to both the expandable article and the non-expandable article, unless until specified explicitly.

The article of the invention may be present in the form of an article having a three-dimensional extent, more preferably a sheet-like form, more particularly in the form of strips or sheets or patches.

Preferably, as strips, these articles are 20-500 mm, more preferred 50-250 mm, in length, 2-15 mm, more preferred 5-10 mm, in width and 0.5-5 mm, more preferred 1-3 mm, in thickness.

Preferably, as patches, these articles are 20-500 mm in length and in width and 0.5-5 mm, more preferred 1-3 mm, in thickness.

The article of the invention is needed particularly for the reinforcement of heat-stable materials, more particularly structural components. Heat-stable materials are dimensionally stable at least during the curing process at a curing temperature of 100-220° C., preferably 150-210° C. Particularly heat-stable materials are metals, plastics (such as ABS, polyamide and polyphenylene ether), polysulfones, polyether sulfones, poly(phenylene ether), and composite materials (such as sheet moulding compounds, unsaturated polyester GRP, composite epoxide materials and composite acrylate materials).

In a preferred application, the structural component being reinforced by the article of the invention is of metal. More particularly the metal has been coated by cathodic electrodeposition (CED).

A particularly preferred use of the article of the invention is in the reinforcement of metals, especially in body shell construction in the automotive industry. The preferred metals include steel and aluminium. The preferred examples of steel includes electrolytically galvanized steel, hot-dip galvanized steel, oiled steel, Bonazinc-coated steel, and subsequently phosphatized steel.

The article of the invention is in particular first contacted with the materials to be reinforced, more particularly structural components, at a temperature of between 10° C. and 80° C., more particularly between 10° C. and 60° C., and are later cured to completion at a temperature of typically 140-220° C., more particularly of 150-210° C., preferably of between 160 and 205° C.

After being cured, the article of the invention provides excellent mechanical properties (such as flexural and torsional strength) to the structural component. The article of the invention gets cured completely when it is subjected to a temperature above the activation temperature of the hardener B. Further, on being cured, the article of the invention gets adhered to the surface of the structural component effectively, especially to metallic substrates.

A further aspect of the present invention therefore relates to a method for reinforcing outer surfaces or hollow cavities of structural components, comprising the steps of
i) placing an article of the invention as described in detail above onto the outer surfaces or into the hollow cavities of the structural components; and
ii) heating the article of the invention, especially the thermosetting epoxy resin composition, to a temperature of 140-220° C., more particularly of 150-210° C., preferably of between 160 and 205° C.

The result of the method for reinforcing outer surfaces or cavities of structural components is a reinforced article. The reinforced article of this kind is preferably a vehicle or an ancillary vehicle component.

A further aspect of the present invention therefore relates to the reinforced article obtained from the aforesaid method.

Furthermore, the article of the invention is suitable not only for automotive construction but also other areas of application. Particularly noteworthy are related applications in transport construction such as boats, lorries, buses and rail, and in the building of consumer goods such as washing machines.

A further aspect of the invention is therefore the use of the article of the invention for reinforcing heat-stable materials, more particularly structural components.

Preferably, the structural components being reinforced have a thickness of 0.2-1.2 mm, preferably 0.4-1.0 mm and more preferably 0.5 and 0.6 mm.

The article of the invention possess self-adhesive properties so may preferably be applied without using any fastening means. The article of the invention may be employed particularly for reinforcement/stiffening at locations which are not accessible to welding instruments/robots during assembly, owing to inaccessibility/narrow confines.

Additional fastening means may be employed to secure the article of the invention on the surface of the structural components. Preferably, the article of the invention has no additional fastening means.

In particular, a further aspect of the present invention relates to a structural reinforcement by using an expandable article.

The expandable article may be mounted, for example, in the cavities of load-bearing columns of the body of a means of transport.

The expandable article placed inside the structural component gets foamed up in the course of heating, and by virtue of the full chemical curing of the thermosetting epoxy resin composition it is capable of transmitting large forces and therefore reinforcing the structural component.

Particular preference is given to the use for reinforcing outer surfaces or cavities, more particularly for reinforcing cavities, in structural components, preferably in vehicle construction or sandwich panel construction.

Further objects, features, and advantages of the present invention will be understood from the following detailed description of preferred embodiments of the present invention with reference to the accompanying figures.

Embodiments of the invention are now described with reference to the accompanying figures, which are given by way of example only, and are not intended to limit the present invention.

FIG. 1 depicts a perspective view of the article of the invention 100 according to an embodiment of the present disclosure. In this embodiment the article of the invention 100 is present in the form of a roll of composite sheet 105.

Preferably the article of the invention 100 is in the form of an article having three-dimensional extent, more preferably having a sheet-like form, more particularly being in the form of a strip or a sheet or a patch.

Figure 2:
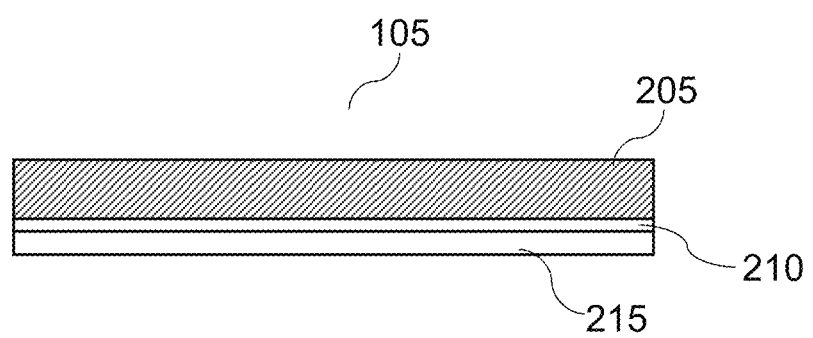
FIG. 2 illustrates a cross-sectional view of the layered structure of the article of the invention according to an embodiment of the present disclosure.

FIG. 2 illustrates a cross-sectional view of the layered structure of the composite sheet 105 of the article of the invention 100 according to an embodiment of the present disclosure. The composite sheet 105 has a layered structure consisting of a reinforcing fibre substrate 205, a release agent layer 210 and a release liner 215. The reinforcing fibre substrate 205 corresponds to the above described first layer L1 and the second layer L2.

The release liner 215 and the release agent layer 210 are typically used to protect the reinforcing fibre substrate 205 during storage and prior to use. The release liner 215 preferably peels away with an easy peel, does not stick aggressively and does not become difficult to remove from the reinforcing fibre substrate 205 during storage. The release liner 215 can be made from numerous materials, but is preferably differentiated from the compositions used to prepare the reinforcing fibre substrate 205. The materials used for the release liner 215 are selected more particularly from the group consisting of paper, silicone or fluorocarbon treated material, polyesters, polyvinyl chloride, cellulose acetate, polypropylene, polyethylene and polyethylene terephthalate films. Preferably, the release liner 215 is made from silicon based material.

The release agent layer can be made from any suitable non-stick material for example silicone. Further, the invention does not limit the use of the release liner 215 and the releasing agent layer 210, so any type of suitable material known in the art can be used to protect the surface of the reinforcing fibre substrate 205 during storage and prior to use.

In an embodiment of the invention the reinforcing fibre substrate 205 does not include the release liner 215 and the release agent layer 210. Typically, in this scenario the reinforcing fibre substrate 205 and the article of the invention 100 are the same.

In a separate embodiment of the invention the release liner 215 is attached to both sides of the reinforcing fibre substrate 205 using the release agent layer 210 between the reinforcing fibre substrate 205 and the release liner 215.

Figure 3:
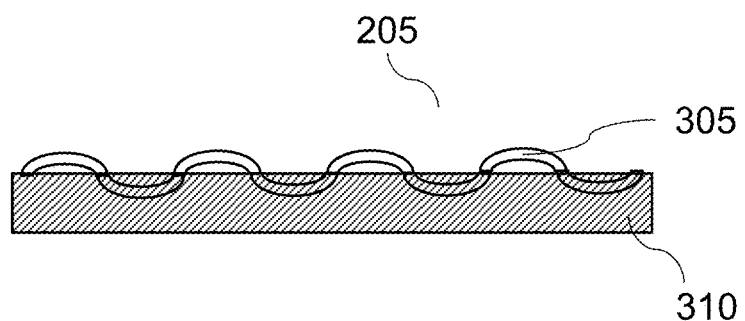
FIG. 3: illustrates a perspective view of the reinforcing fibre substrate of the article of the invention according to an embodiment of the present disclosure.

FIG. 3 illustrates a perspective view of the reinforcing fibre substrate 205 according to an embodiment of the present disclosure. The reinforcing fibre substrate 205 includes a carbon fibre fabric layer 305 and a thermosetting epoxy resin layer 310. The carbon fibre fabric layer 305 corresponds to the first layer L1 (as described above) and the thermosetting epoxy resin layer 310 corresponds to the second layer L2 (as described above).

Preferably, the carbon fibre fabric layer 305 and the thermosetting epoxy resin layer 310 are in direct contact with each other. More preferably, the carbon fibre fabric layer 305 is partially embedded in the thermosetting epoxy resin layer 310. Even more preferably, the carbon fibre fabric layer 305 is embedded in the thermosetting epoxy resin layer 310 to less than 50% of the thickness of the carbon fibre fabric layer 305, preferably, to less than 20%, more preferably to less than 10% of the thickness of the carbon fibre fabric layer 305.

Preferably, the reinforcing fibre substrate 205 is in the form of a prepreg.

Figure 4:
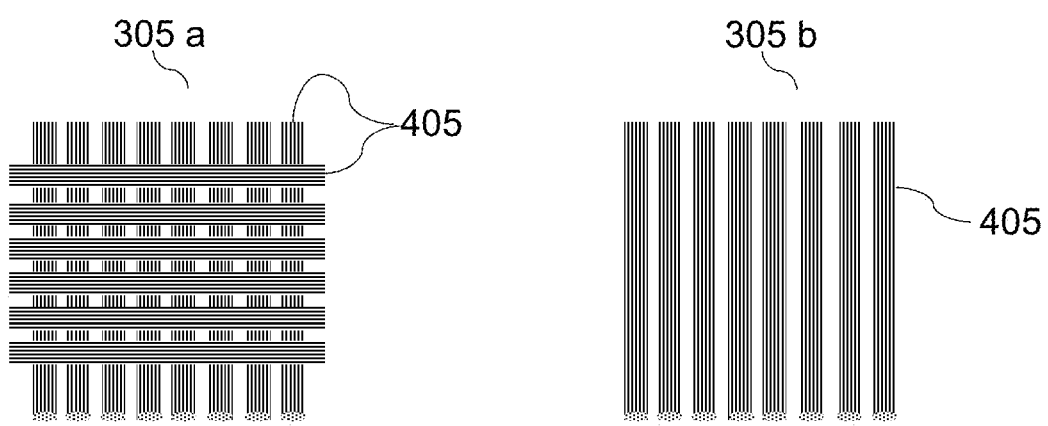
FIG. 4 illustrate a close view of the non-random fabric of bundles of carbon fibres according to one or more embodiments of the present disclosure.

FIG. 4 is a schematic plan view of the carbon fibre fabric layer 305 (i.e. non-random fabric of bundles of carbon fibres or the first layer L1) according to one or more embodiments of the present disclosure. The carbon fibre fabric layer 305 is formed preferably by arranging bundles of carbon fibres 405 in one or more patterns selected from the group consisting of a bidirectional arrangement 305a and a unidirectional arrangement 305b.

In the bidirectional arrangement 305a, the bundles of carbon fibres 405 are preferably arranged perpendicular to each other i.e. in this arrangement the bundles of carbon fibres 405 cross each other at 90 degree angle.

In the unidirectional arrangement 305b, the bundles of carbon fibres 405 are preferably arranged in parallel to each other and in one direction. More particularly, in the unidirectional arrangement 305b majority of the carbon fibre bundles are in one direction only. However, a small amount of carbon fibres, bundles of carbon fibres 405 or other material may run in other directions as well. This is done primarily to hold the bulk of bundles of carbon fibres 405 in one direction, although other fibres may also offer some structural properties. In this arrangement of fibres, load is taken in the direction of the bundles of carbon fibres 405.

The non-random arrangement of bundles of carbon fibres refers to an arrangement in which the bundles of carbon fibres 405 are preferably arranged in a specific pattern or orientation to form the carbon fibre fabric layer 305 for example, the bidirectional arrangement 305a and the unidirectional arrangement 305b. Preferably, the bundles of carbon fibres 405 are formed using continuous carbon fibres or filaments.

Preferably, the carbon fibre fabric layer 305 can be present in a form selected from the group consisting of woven fabric, knitted fabric and braid fabric. More preferably the carbon fibre fabric layer 305 is present in the form of woven fabric.

Preferably, the carbon fibre fabric layer 305 is in the form of a unidirectional sheet.

Figure 5:
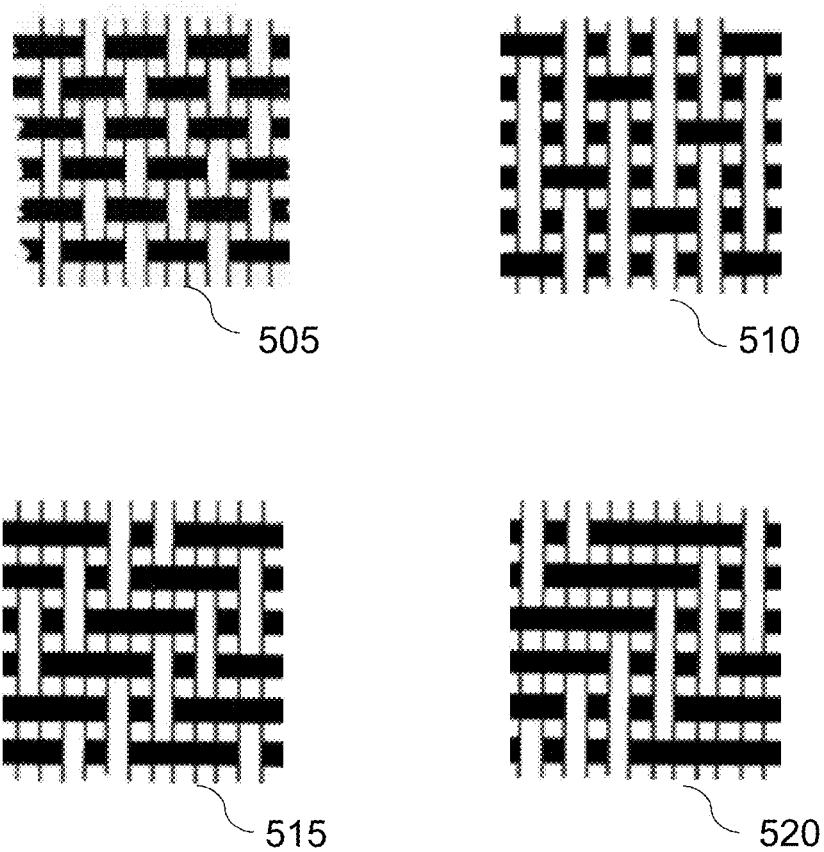
FIG. 5 illustrate exemplary weaving patterns of the non-random fabric of bundles of carbon fibres according to one or more embodiments of the present disclosure.

FIG. 5 depicts exemplary weaving patterns of the carbon fibre fabric layer 305 according to one or more embodiments of the present disclosure. Preferably, the bundles of carbon fibres 405 can be woven in one or more configurations selected from the group consisting of a plain weave 505, a satin weave 510, a twill weave (2/2) 515 and a twill weave (3/3) 520.

Figure 6:
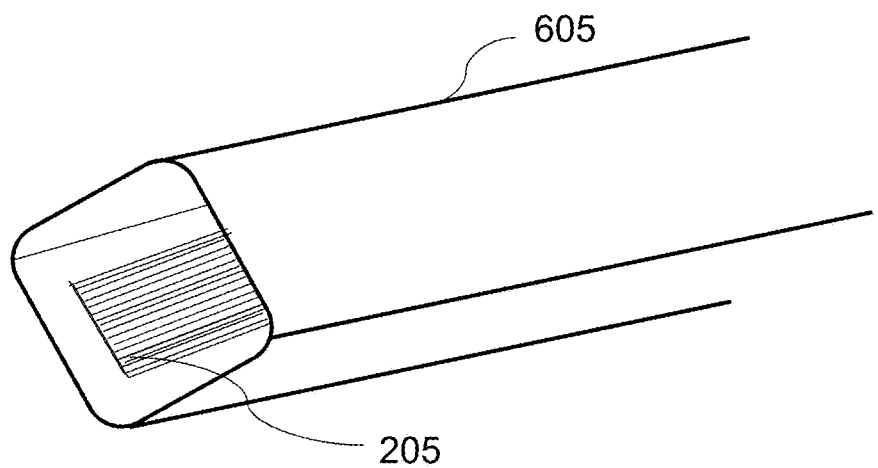
FIG. 6 illustrate a reinforced structural component with the article of the invention according to an embodiment of the present disclosure.

FIG. 6 illustrates reinforcement of a structural component 605 using the reinforcing fibre substrate 205 of the article of the invention 100 according to an embodiment of the present disclosure.

In a preferred embodiment, the reinforcing fibre substrate 205 is placed on the surface the structural component 605. The reinforcing fibre substrate 205 being tacky in nature attaches itself to the structural component 605. Further, the reinforcing fibre substrate 205 gets cured on the surface of structural component 605 when subjected to an elevated temperature and provides a reinforced article having improved torsional and flexural strength.

In yet another embodiment, the reinforcing fibre substrate 205 is used to reinforce a hollow cavity of a structural component 605. Firstly, the reinforcing fibre substrate 205 is secured inside the hollow cavity of a structural component 605. The reinforcing fibre substrate 205 being tacky attaches itself to the hollow cavity of a structural component 605. Further, the reinforcing fibre substrate 205 gets cured inside the hollow cavity of a structural component 605 when subjected to an elevated temperature and provides a reinforced article having improved torsional and flexural strength. Preferably, curing is performed at a temperature between 100 to 220° C., more preferably between 150 to 220° C.

In an embodiment, the reinforcing fibre substrate 205 also includes a blowing agent E. The inclusion of the blowing agent E makes the reinforcing fibre substrate 205 expandable. Preferably, the reinforcing fibre substrate 205 with the blowing agent E expands between 100-300%. Preferably, the reinforcing fibre substrate 205 fill the space inside the hollow cavity of structural component 605 along with providing necessary reinforcement.

The result of curing the reinforcing fibre substrate 205 on the surface of the structural component 605 or inside the hollow cavity of a structural component 605 is a reinforced article. The reinforced article of this kind is preferably a vehicle or an ancillary vehicle component.

In an embodiment, to secure or attach the reinforcing fibre substrate 205 on the surface of the structural component 605 or within the hollow cavity of structural component 605 one or more fasteners are used. The fastener can be an adhesive fastener, a mechanical fastener and combination thereof. In a further embodiment, the fastener is an adhesive fastener such as a metal glue and a plastic glue. In another embodiment, the fastener is an adhesive selected from a group consisting of a double-sided tape, a masking tape, an electrical tape and a duct tape. The fastener means may also be a mechanical fastener, such as a nut and bolt, screws, rivets, staples, or clamps.

Preferably, the reinforcing fibre substrate 205 is self-adhering and additional fastening means are not required to attach the reinforcing fibre substrate 205 on the surface of the structural component 605 or within the hollow cavity of structural component 605.

Preferred examples of the structural component 605 are selected more particularly from the list consisting of a pillar of vehicle, cavity structure within the vehicle, an engine component, a chassis, a door skin, a quarter panel, a trunk structure of vehicle, a lid structure of vehicle, a vehicle hood, a floor mat of vehicle and a roof structure of vehicle.

A skilled artisan will appreciate that the reinforcing fibre substrate 205 disclosed herein can be used in any location within a vehicle. For example, pillar to door regions, roof to pillar, mid-pillar, roof rails, windshield or other window frames, deck lids, hatches, removable top to roof locations, other vehicle beltline locations, motor rails, lower sills, cross members, lower rails, and the like.

Figure 7:
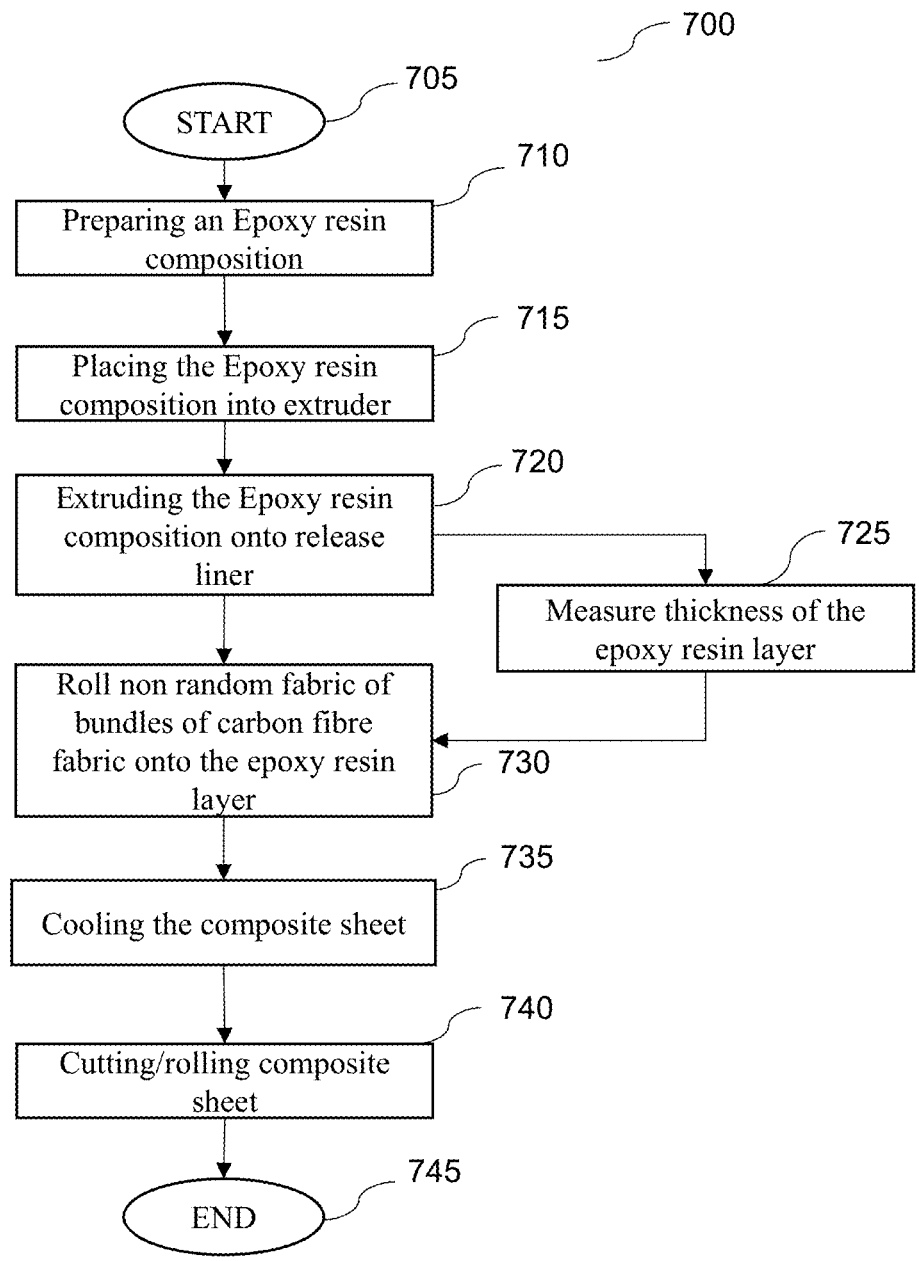
FIG. 7 is a method flow chart illustrating a process to manufacture the article of the invention according to an embodiment of the present disclosure.

FIG. 7 is a method flow chart to manufacture the article of the invention 100 according to an exemplary embodiment of the present disclosure. The method 700 starts at step 705.

At step 710, the thermosetting epoxy resin composition is prepared using the epoxy resin A, the hardener B for epoxy resins, preferably the accelerator C and the impact modifier D.

In an embodiment, the blowing agent E is also added to the thermosetting epoxy resin composition. In a further embodiment one or more fillers (as described earlier) are added to the thermosetting epoxy resin composition. In yet another embodiment one or more stabilizers are added to the thermosetting epoxy resin composition.

At step 715 the thermosetting epoxy resin composition is placed within an extruder.

At step 720, the thermosetting epoxy resin composition is extruded onto a release liner 215. Thus, the thermosetting epoxy resin layer 310 gets formed on the release liner 215.

Preferably, the release agent layer 210 is also present between the thermosetting epoxy resin layer 310 the release liner 215.

At step 725, the thickness of the thermosetting epoxy resin layer 310 is measured.

Preferably, the thickness of thermosetting epoxy resin layer is measured using a Vernier caliper.

At step 730, the carbon fibre fabric layer 305 is rolled onto the thermosetting epoxy resin layer 310 to form a composite sheet 105.

At step 735, the composite sheet 105 is cooled before it is rolled for storage. Cooling can be done using natural air venting, a rest period or cold air.

At step 740, the composite sheet 105 is rolled to form the article of the invention 100.

The method 700 stops at step 745.

Figure 8:
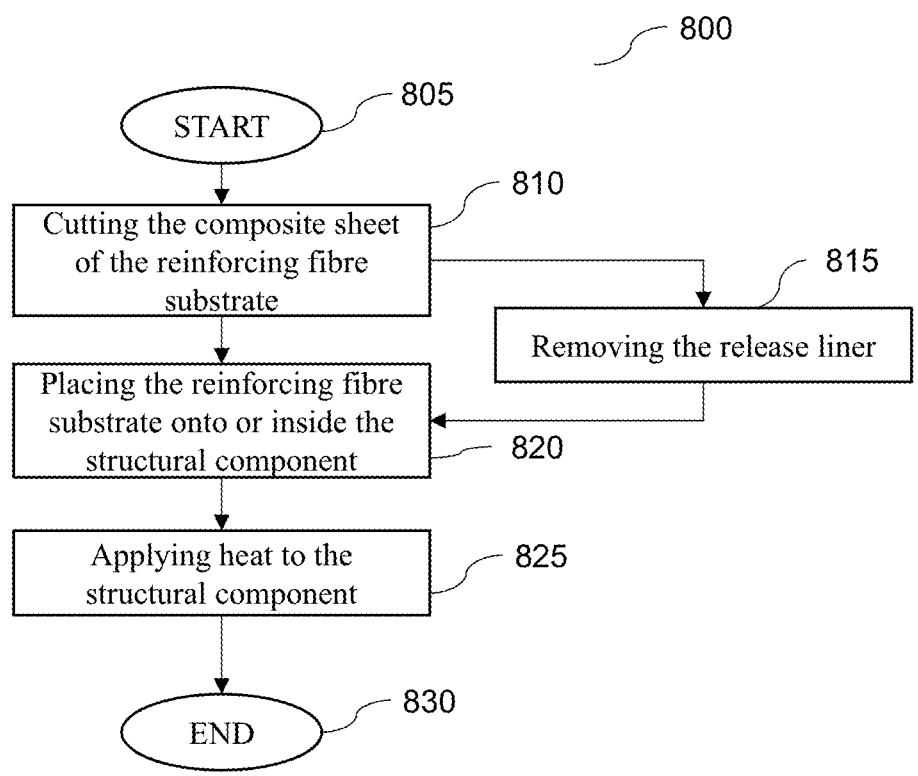
FIG. 8 is a method flow chart to illustrate the reinforcement of a structural component according to an embodiment of the present disclosure.

FIG. 8 is a method 800 for reinforcing a structural component 605 using the article of the invention 100 according to an embodiment of the present disclosure. The method 800 starts at step 805.

At step 810, the article of the invention 100 is cut to obtain the desired shape for the intended use.

At step 815, the release liner 215 is removed from the article of the invention 100. Once the release liner 215 is removed from the article of the invention 100, a tacky layer of the reinforcing fibre substrate 205 gets exposed.

At step 820, the reinforcing fibre substrate 205 is placed on the surface of the structural component 605. Being tacky in nature the reinforcing fibre substrate 205 adheres itself to the surface of the structural component 605.

In an embodiment, additional fastening means are also used to secure/adhere the reinforcing fibre substrate 205 onto or into the structural component 605

At step 825, the structural component 605 is heated to cure the reinforcing fibre substrate 205 and form the reinforced article.

The method 800 ends at step 830.

EXAMPLES

Set out below are a number of examples which further illustrate the invention but are in no way intended to restrict the scope of the invention. Unless indicated otherwise, all proportions and percentages are by weight.

Raw materials used for preparing the impact modifier SM1 and the thermosetting epoxy resin composition Adhesive 1-3 were as follows:

| Raw materials used | Description | Supplier |
| --- | --- | --- |
| HDI | Hexamethylene diisocyanate | Sigma-Aldrich |
| PolyTHF ®2000 | Polytetramethylene ether glycol | BASF |
| Phenol | Phenol | Sigma-Aldrich |
| Dibutyltin dilaurate (DBTL) | Catalyst | Thorson |
| Araldite GY 250 | Bisphenol A-based liquid epoxy resin (epoxy resin A) | Huntsman |
| Dicyandiamide | Dicyandiamide (Hardener B) | Sigma-Aldrich |
| N,N-Dimethylurea | (Accelerator C) | Sigma-Aldrich |
| Hypro ™ | Carboxy-terminated acrylonitrile/ butadiene copolymer (Impact Modifier D) | Emerald Performance Materials LLC |
| Celogen ™ | Azodicarbonamide (Blowing agent E) | Chemtura |
| TRACEL ® OBSH | Oxybisbenzenesulfonyl hydrazide (Blowing agent E) | Tramaco |
| Aerosil R202 | Pyrogenic silica | Evonik |
| Polycal OS325 | Calcium oxide | Fitz Chem Corp. |
| Winnofil SPT | Calcium carbonate | Solvay |

Preparation of the Impact Modifier (SM1)

300.0 g of PolyTHF®2000 (BASF) and 56.7 g of hexamethylene diisocyanate (HDI) were mixed together with 0.04 g of dibutyltin dilaurate (DBTL) in a vessel. After mixing had taken place under reduced pressure at 60° C. for 2 hours, an NCO content of 4.1% was measured. The NCO-terminated polyurethane polymer thus formed was admixed with 39.3 g of phenol (Aldrich), stirred further under reduced pressure at 100° C. for 3 hours and stored at 70° C. for 12 hours. Thereafter the NCO content measured was 0%

Determination of the Isocyanate Content

The isocyanate content in weight % was determined by back-titration using di-n-butylamine employed in excess and 0.1 M hydrochloric acid. All of the determinations were performed semi-manually on a Mettler-Toledo DL 50 Graphix titrator with automatic potentiometric endpoint determination. For this purpose, 600-800 mg of the particular sample were dissolved in each case with heating in a mixture of 10 ml of isopropanol and 40 ml of xylene, and then reacted with a solution of dibutylamine in xylene. Excess di-n-butylamine was titrated with 0.1 M hydrochloric acid, and from this the isocyanate content was calculated.

Determination of the Viscosity

The viscosity was measured oscillographically by means of a rheometer having a heatable plate (MCR 201, Anton-Paar) (gap 1000 μm, measuring plate diameter: 25 mm (plate/plate), deformation 0.01 at 5 Hz, temperature: 80° C., heating rate 10° C./min).

The viscosity of all the thermosetting epoxy resin compositions was between 50-6000 Pa·s at 80° C. All the thermosetting epoxy resin compositions at room temperature had a surface tack such that after the surface of a sample with an intrinsic weight of 50 g had been pressed with a thumb, exerting a pressure of 5 kg for 1 second, said sample could be lifted up for at least 5 seconds.

Determination of Load—3-Point Bend Test

The flexural strength of the composites samples is evaluated by using a 3-point bend test (also known as Three point flexural test). The protocol for performing the 3-point bend test is as provided below:

At step 1, apply a sheet of the epoxy-composite laminate (i.e. reinforcing fabric layer 205) 25 mm×150 mm (1 in.×6 in.), at the specified thickness, to a pre-lubricated strip of steel of dimensions 0.8 mm×25 mm×150 mm (0.032 inch×1 inch×6 inch).

At step 2, pressurize the laminate to the metal by means of two passes with a 0.9 kg (2 lb.) roller.

At step 3, cure test specimens at the specified bake schedule. Allow the cured specimens to condition to room temperature for a minimum period of 4 hours prior to environmental exposures. Age the assemblies as specified.

At step 4, place test specimens on the 3 point-bend fixture.

At step 5, apply a load to the test specimen at a rate of 5 mm (0.2 inch) per minute and terminate the test when the laminate fails.

At step 6, record the peak and load at failure and supply the load versus deflection charts as part of the test data.

The 3-point bend fixture used to perform the flexural test has a support span of 4 inch, an upper support anvils diameter of 6 inch and a lower support anvils diameter of 6 inch.

The thermosetting epoxy resin compositions Adhesive 1-3 used for preparing the composite samples/test specimen Ex. 1-25 and comparative examples Ref 1-23 are set out in Table 1.

The composites samples/test specimen Ex. 1-25 and comparative examples Ref 1-23 are set out in Table 2.

The measured flexural strength (peak load, load at deflection of 1 mm, load at deflection 2 mm and load at deflection of 5 mm) for composites samples/test specimen Ex. 1-25 and comparative examples Ref 1-23 are set out in Table 3.

By analysing Table 2 and 3, it is apparent that the comparative examples Ref 1-8 which were prepared by using fibre glass have significantly lower load taking capacities in comparison with the composites prepared by using the inventive articles of the invention Ex. 1-25.

From the Table 3 it is apparent that composites prepared by using non-random fabric of carbon fibres (ex. plain or unidirectional type) have improved peak load value in comparison with the composites prepared from non-structured fabric of carbon fibres. This is evident by comparing examples Ex.3, Ex.9 and Ex. 13 with comparative example Ref.9.

Further, the composites prepared by using unidirectional fabric of bundles of carbon fibres showed improved load values (i.e. peak load, load at deflection of 1 mm, load at deflection 2 mm and load at deflection of 5 mm) in comparison to composites prepared by using plain fabric of carbon fibres. This is well evident form Table 3 by comparing Ex.3, Ex.9 and Ex. 13.

The unidirectional carbon fibre fabric, used for the preparation of composites, from different manufacturers gives similar results. This is evident from comparing Ex.1-6 with Ex. 7-12 in the Table 3.

It is determined experimentally that the highest improvement of flexural strength of the manufactured composites/test specimen could be achieved when the thickness of adhesive is more than 0.2 mm. On comparing the peak load values Ex. 14 with Ex. 15 and Ex.17 with Ex. 18 in Table 3, it is evident that improvement in flexural strength is insignificant when thickness of adhesive is 0.2 mm.

The peak load value and the load value at 5 mm deflection are much higher when the sheet metal is thin. This is evident by comparing the Ex.1-6 with Ex. 20-25 in Table 3.

All these examples are given for illustrative purposes only and are not supposed to limit the invention, as defined by the claims, appended hereto.

TABLE 1

| | Epoxy resin compositions | | |
|---|---|---|---|
| | Adhesive 1 | Adhesive 2 | Adhesive 3 |
| Epoxy Resin A | 25% wt | 45% wt | 30% wt |
| Hardener B | 4% wt, Dicyandiamide | 4% wt, Dicyandiamide | 4% wt, Dicyandiamide |
| Accelerator C | 0.3% wt, N,N-Dimethylurea, | 2% wt, N,N-Dimethylurea, | 0.3% wt, N,N-Dimethylurea, |
| Impact Modifier D | 25% wt, carboxyl-terminated acrylonitrile/butadiene copolymer | 20% wt, terminally blocked polyurethane prepolymer (SM1) 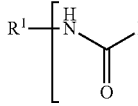 | 40% wt, terminally blocked polyurethane prepolymer (SM1) 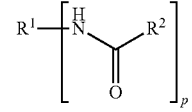 |
| Blowing Agent E | 1 Wt-%, Azodicarbonamide | — | — |

TABLE 2

| S. No. | Epoxy Resin composition | Details of Fibre reinforcement | | | | Thickness before cure (in mm) | | | Part Composite Mass (g) |
|---|---|---|---|---|---|---|---|---|---|
| | | Type | Manufacturer | Weight (in Oz) | Weave | Sheet metal | Adhesive | Top Composite | |
| Ex. 1 | Adhesive 1 | Carbon fibre | ACP | 2.9 | Unidirectional | 0.80 | 0.8 | 0.16 | 4.65 |
| Ex. 2 | Adhesive 1 | Carbon fibre | ACP | 2.9 | Unidirectional | 0.80 | 0.9 | 0.16 | 4.95 |
| Ex. 3 | Adhesive 1 | Carbon fibre | ACP | 2.9 | Unidirectional | 0.80 | 1.0 | 0.16 | 5.25 |
| Ex. 4 | Adhesive 1 | Carbon fibre | ACP | 2.9 | Unidirectional | 0.80 | 1.2 | 0.16 | 6.49 |
| Ex. 5 | Adhesive 1 | Carbon fibre | ACP | 2.9 | Unidirectional | 0.80 | 1.3 | 0.16 | 7.13 |
| Ex. 6 | Adhesive 1 | Carbon fibre | ACP | 2.9 | Unidirectional | 0.80 | 1.5 | 0.16 | 8.29 |
| Ex. 7 | Adhesive 1 | Carbon fibre | Sika | 4.0 | Unidirectional | 0.80 | 0.8 | 0.21 | 4.99 |
| Ex. 8 | Adhesive 1 | Carbon fibre | Sika | 4.0 | Unidirectional | 0.80 | 0.9 | 0.21 | 5.25 |
| Ex. 9 | Adhesive 1 | Carbon fibre | Sika | 4.0 | Unidirectional | 0.80 | 1.0 | 0.21 | 5.46 |
| Ex. 10 | Adhesive 1 | Carbon fibre | Sika | 4.0 | Unidirectional | 0.80 | 1.2 | 0.21 | 6.85 |
| Ex. 11 | Adhesive 1 | Carbon fibre | Sika | 4.0 | Unidirectional | 0.80 | 1.3 | 0.21 | 7.60 |
| Ex. 12 | Adhesive 1 | Carbon fibre | Sika | 4.0 | Unidirectional | 0.80 | 1.5 | 0.21 | 8.26 |
| Ex. 13 | Adhesive 1 | Carbon fibre | Fiber Glast | 3.5 | 1K plain | 0.80 | 1.00 | 0.23 | 28.28 |
| Ex. 14 | Adhesive 2 | Carbon fibre | ACP | 2.9 | Unidirectional | 0.80 | 0.2 | 0.16 | 1.66 |
| Ex. 15 | Adhesive 2 | Carbon fibre | ACP | 2.9 | Unidirectional | 0.80 | 0.5 | 0.16 | 3.83 |
| Ex. 16 | Adhesive 2 | Carbon fibre | ACP | 2.9 | Unidirectional | 0.80 | 1.0 | 0.16 | 6.13 |
| Ex. 17 | Adhesive 3 | Carbon fibre | ACP | 2.9 | Unidirectional | 0.80 | 0.2 | 0.16 | 1.74 |
| Ex. 18 | Adhesive 3 | Carbon fibre | ACP | 2.9 | Unidirectional | 0.80 | 0.5 | 0.16 | 3.62 |
| Ex. 19 | Adhesive 3 | Carbon fibre | ACP | 2.9 | Unidirectional | 0.80 | 1.0 | 0.16 | 6.17 |
| Ex. 20 | Adhesive 1 | Carbon fibre | ACP | 2.9 | Unidirectional | 0.59 | 0.8 | 0.16 | 4.53 |

TABLE 2-continued

| S. No. | Epoxy Resin composition | Details of Fibre reinforcement | | | | Thickness before cure (in mm) | | | Part Composite Mass (g) |
|---|---|---|---|---|---|---|---|---|---|
| | | Type | Manufacturer | Weight (in Oz) | Weave | Sheet metal | Adhesive | Top Composite | |
| Ex. 21 | Adhesive 1 | Carbon fibre | ACP | 2.9 | Unidirectional | 0.59 | 0.9 | 0.16 | 4.91 |
| Ex. 22 | Adhesive 1 | Carbon fibre | ACP | 2.9 | Unidirectional | 0.59 | 1.0 | 0.16 | 5.11 |
| Ex. 23 | Adhesive 1 | Carbon fibre | ACP | 2.9 | Unidirectional | 0.59 | 1.2 | 0.16 | 7.05 |
| Ex. 24 | Adhesive 1 | Carbon fibre | ACP | 2.9 | Unidirectional | 0.59 | 1.3 | 0.16 | 7.38 |
| Ex. 25 | Adhesive 1 | Carbon fibre | ACP | 2.9 | Unidirectional | 0.59 | 1.5 | 0.16 | 8.20 |
| Ref. 1 | Adhesive 1 | Fiberglass | Fibertex | 12.4 | Plain | 0.80 | 0.8 | 0.42 | 5.78 |
| Ref. 2 | Adhesive 1 | Fiberglass | Fibertex | 12.4 | Plain | 0.80 | 0.9 | 0.42 | 6.04 |
| Ref. 3 | Adhesive 1 | Fiberglass | Fibertex | 12.4 | Plain | 0.80 | 1.0 | 0.42 | 6.45 |
| Ref. 4 | Adhesive 1 | Fiberglass | Fibertex | 12.4 | Plain | 0.80 | 1.2 | 0.42 | 7.39 |
| Ref. 5 | Adhesive 1 | Fiberglass | Fibertex | 12.4 | Plain | 0.80 | 1.3 | 0.42 | 8.06 |
| Ref. 6 | Adhesive 1 | Fiberglass | Fibertex | 12.4 | Plain | 0.80 | 1.5 | 0.42 | 9.27 |
| Ref. 7 | Adhesive1 | Fiberglass | Nittobo WLA 209 | 6.2 | plain weave | 0.80 | 1.00 | 0.21 | 6.26 |
| Ref. 8 | Adhesive1 | Fiberglass | UnichikaH203 | 6.2 | plain weave | 0.80 | 1.00 | 0.21 | 6.24 |
| Ref. 9 | Adhesive1 | Carbon Fiber | MC-06C 0.5 C.F. Tissue Parallel | 0.5 | non-structured | 0.80 | 1.00 | | 5.20 |
| Ref. 10 | Adhesive2 | Fiberglass | Nittobo WLA 209 | 6.2 | plain weave | 0.80 | 0.2 | 0.21 | 1.57 |
| Ref. 11 | Adhesive2 | Fiberglass | Nittobo WLA 209 | 6.2 | plain weave | 0.80 | 0.5 | 0.21 | 3.79 |
| Ref. 12 | Adhesive2 | Fiberglass | Nittobo WLA 209 | 6.2 | plain weave | 0.80 | 1.0 | 0.21 | 5.76 |
| Ref. 13 | Adhesive2 | Fiberglass | UnichikaH203 | 6.2 | plain weave | 0.80 | 0.2 | 0.21 | 1.82 |
| Ref. 14 | Adhesive2 | Fiberglass | UnichikaH203 | 6.2 | plain weave | 0.80 | 0.5 | 0.21 | 3.96 |
| Ref. 15 | Adhesive2 | Fiberglass | UnichikaH203 | 6.2 | plain weave | 0.80 | 1.0 | 0.21 | 5.94 |
| Ref. 16 | Adhesive 3 | Fiberglass | Nittobo WLA 209 | 6.2 | plain weave | 0.80 | 0.2 | 0.21 | 1.94 |
| Ref. 17 | Adhesive 3 | Fiberglass | Nittobo WLA 209 | 6.2 | plain weave | 0.80 | 0.5 | 0.21 | 3.45 |
| Ref. 18 | Adhesive 3 | Fiberglass | Nittobo WLA 209 | 6.2 | plain weave | 0.80 | 1.0 | 0.21 | 5.79 |
| Ref. 19 | Adhesive 3 | Fiberglass | UnichikaH203 | 6.2 | plain weave | 0.80 | 0.2 | 0.21 | 2.64 |
| Ref. 20 | Adhesive 3 | Fiberglass | UnichikaH203 | 6.2 | plain weave | 0.80 | 0.5 | 0.21 | 4.06 |
| Ref. 21 | Adhesive 3 | Fiberglass | UnichikaH203 | 6.2 | plain weave | 0.80 | 1.0 | 0.21 | 6.22 |
| Ref. 22 | — | — | — | — | — | 0.80 | — | — | 18.16 |
| Ref. 23 | — | — | — | — | — | 0.59 | — | — | 23.52 |

TABLE 3

| S. No. | Load Values (N) | | | |
|---|---|---|---|---|
| | Peak Load | Load @ 1 mm deflection | Load @ 2 mm deflection | Load @ 5 mm deflection |
| Ex. 1 | 201 | 46 | 85 | 167 |
| Ex. 2 | 257 | 40 | 74 | 159 |
| Ex. 3 | 281 | 48 | 93 | 204 |
| Ex. 4 | 362 | 59 | 121 | 261 |
| Ex. 5 | 446 | 82 | 162 | 316 |
| Ex. 6 | 477 | 97 | 180 | 356 |
| Ex. 7 | 257 | 41 | 77 | 166 |
| Ex. 8 | 259 | 42 | 81 | 165 |
| Ex. 9 | 293 | 46 | 92 | 192 |
| Ex. 10 | 395 | 64 | 131 | 267 |
| Ex. 11 | 463 | 72 | 152 | 322 |
| Ex. 12 | 535 | 83 | 173 | 359 |
| Ex. 13 | 176 | 39 | 72 | 146 |
| Ex. 14 | 52 | — | 21 | — |
| Ex. 15 | 117 | — | 35 | — |
| Ex. 16 | 216 | — | 60 | — |
| Ex. 17 | 55 | — | 21 | — |
| Ex. 18 | 115 | — | 33 | — |
| Ex. 19 | 232 | — | 59 | — |
| Ex. 20 | 366 | 42 | 78 | 191 |
| Ex. 21 | 405 | 47 | 90 | 221 |
| Ex. 22 | 407 | 51 | 103 | 248 |
| Ex. 23 | 512 | 77 | 151 | 352 |
| Ex. 24 | 608 | 93 | 186 | 441 |
| Ex. 25 | 570 | 99 | 198 | 469 |
| Ref. 1 | 202 | 27 | 47 | 94 |
| Ref. 2 | 186 | 25 | 45 | 93 |
| Ref. 3 | 251 | 32 | 55 | 115 |
| Ref. 4 | 283 | 36 | 66 | 144 |
| Ref. 5 | 321 | 40 | 74 | 159 |
| Ref. 6 | 380 | 46 | 88 | 192 |
| Ref. 7 | 175 | — | 45 | — |
| Ref. 8 | 142 | — | 44 | — |
| Ref. 9 | 43 | — | 24 | — |
| Ref. 10 | 28 | — | 20 | — |
| Ref. 11 | 74 | — | 24 | — |
| Ref. 12 | 125 | — | 34 | — |
| Ref. 13 | 45 | — | 21 | — |
| Ref. 14 | 71 | — | 25 | — |
| Ref. 15 | 107 | — | 34 | — |
| Ref. 16 | 44 | — | 20 | — |
| Ref. 17 | 65 | — | 23 | — |
| Ref. 18 | 109 | — | 29 | — |
| Ref. 19 | 46 | — | 21 | — |
| Ref. 20 | 63 | — | 23 | — |
| Ref. 21 | 94 | — | 31 | — |
| Ref. 22 | 26 | 11 | 15 | 20 |
| Ref. 23 | 65 | 10 | 14 | 31 |

The invention claimed is:
1. Article consisting of:
a first layer made of a non-random fabric of bundles of carbon fibres; and
a second layer consisting of a thermosetting epoxy resin composition, the thermosetting epoxy resin composition consisting of:
10-30 weight % of at least one epoxy resin having on average more than one epoxide group per molecule;
1-6 weight % of at least one hardener for the at least one epoxy resins which is activated by elevated temperature;
0-3 weight % of at least one accelerator;
10-50 weight % of at least one impact modifier; based on the total weight of the thermosetting epoxy resin composition, and the thermosetting epoxy resin com- position is tacky at room temperature, and the second layer has a thickness of 0.4-2.5 mm; and
optionally at least one physical or chemical blowing agent.

2. The article according to claim 1, wherein the at least one physical or chemical blowing agent is present in the thermosetting epoxy resin composition.

3. The article according to claim 2, wherein the at least one physical or chemical blowing agent is present in an amount of 0.01-3 weight % based on the total weight of the epoxy resin composition.

4. The article according to claim 1, wherein the each bundle of the non-random fabric of bundles of carbon fibres is made of a plurality of continuous carbon fibres.

5. The article according to claim 1, wherein the non-random fabric of bundles of carbon fibres is selected from the list of woven fabric, knitted fabric, braid fabric, unidirectional sheet and fabric of multi-axial sheet.

6. The article according to claim 1, wherein the non-random fabric of bundles of carbon fibres is in unidirectional arrangement.

7. The article according to claim 1, wherein the thermosetting epoxy resin composition has a viscosity at 80° C. of between 50-6000 Pa·s, the viscosity being determined by oscillographic methods by means of a rheometer with heatable plate under the following conditions: 1000 µm gap, measurement plate diameter: 25 mm plate/plate, deformation 0.01 at 5 Hz, and temperature: 80° C.

8. The article according to claim 1, wherein the accelerator is selected from substituted ureas.

9. The article according to claim 8, wherein the substituted ureas are selected from the group consisting of 3-(3-chloro-4-methylphenyl)-1,1-dimethylurea (chlortoluron), p-chlorophenyl-N,N-dimethylurea (monuron), 3-phenyl-1,1-dimethylurea (fenuron), 3,4-dichlorophenyl-N,N-dimethylurea (diuron), N,N-dimethylurea, N-isobutyl-N',N'-dimethylurea and 1,1'-(hexane-1,6-diyl)bis(3,3'-dimethylurea).

10. The article according to claim 1, wherein the first layer has a thickness of 0.10 to 0.80 mm.

11. The article according to claim 1, wherein the first layer is in direct contact with the second layer.

12. The article according to claim 1, wherein the first layer is at least partially embedded in the second layer.

13. The article according to claim 1, wherein the first layer is embedded in the second layer to less than 50% of the thickness of the first layer.

14. Method for reinforcing outer surfaces or hollow cavities of structural components, comprising the steps of
i) placing the article according to claim 1 onto the outer surfaces or into the hollow cavities of the structural components; and
ii) heating the article to a temperature of 140-220° C.

15. A reinforced article obtained from the method according to claim 14.

16. The reinforced article according to claim 15, wherein the reinforced article is a vehicle or an ancillary vehicle component.

17. The method of claim 14, wherein the structural components being reinforced have thickness of 0.2-1.2 mm.

18. The article according to claim 1, wherein the article is a strip, a sheet or a patch.

19. The article according to claim 1, wherein after a surface of the thermosetting epoxy resin composition has been pressed with a thumb, exerting a pressure of 5 kg for 1 second, the thermosetting epoxy resin composition, which has an intrinsic weight of 50 g, can be lifted up for at least 5 seconds.

20. The article according to claim 1, wherein
the at least one epoxy resin having on average more than one epoxide group per molecule has a structure of formula (I):

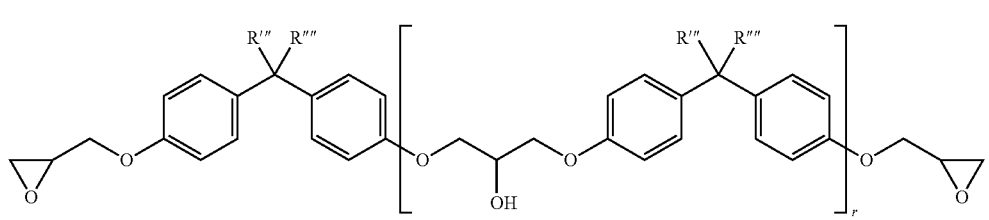

where
R''' and R'''' independently of one another are either H or CH$_3$, and
r is from 0 to 1.

* * * * *